United States Patent Office 3,427,350
Patented Feb. 11, 1969

3,427,350
PRODUCTION OF DICARBOXYLIC ACIDS
Stanley Frederic Marrian, Aberdour, Fife, and Max Marin Wirth, Dollar, Clackmannanshire, Scotland, assignors, by mesne assignments, to British Hydrocarbon Chemicals Limited, London, England
No Drawing. Filed Apr. 14, 1966, Ser. No. 542,475
Claims priority, application Great Britain, Apr. 23, 1965, 17,267/65
U.S. Cl. 260—537        11 Claims
Int. Cl. C07c 51/18, 55/04, 139/04

ABSTRACT OF THE DISCLOSURE

A cycloalkane containing between 4 and 12 carbon atoms is sulphoxidized with sulfur dioxide and oxygen and the resulting cycloalkane sulfonic acid or a salt is treated with molecular oxygen under conditions that the material remains in the liquid phase. A temperature between 90° and 200° C. and a pressure between 10–200 atmospheres are satisfactory. The commercially valuable dicarboxylic acids are produced. The starting material may be used while still in the crude form and di- and polysulfonic acids in which the sulfonic groups are on different carbon atoms, may also be used.

---

The present invention relates to the production of dicarboxylic acids. Certain dicarboxylic acids are of considerable technical importance. Thus adipic acid is an intermediate in the production of nylon.

According to the present invention the process for the production of dicarboxylic acids comprises contacting a cycloalkane sulphonic acid, or a salt of a cycloalkane sulphonic acid, with molecular oxygen at an elevated temperature.

Suitable cycloalkane sulphonic acids are those containing from 4 to 12 carbon atoms in the ring, in particular, cyclobutane, cyclopentane, cyclohexane, cycloheptane, cyclo-octane and cyclodedecane sulphonic acids.

Substituents, in particular alkyl groups, may be present (thus methyl cyclopentane sulphonic acid may be used) but the unsubstituted alkane sulphonic acids are generally preferred.

The cycloalkane sulphonic acid may be obtained by any convenient method, for example, by sulphoxidation of cycloalkanes with $SO_2$ and $O_2$. When prepared by sulphoxidation the cycloalkane sulphonic acid may be used not only in the highly purified form, but also as the crude sulphoxidation product, either as such or preferably dissolved in water and steam distilled to remove volatile constituents of the reaction mixture. In a further refinement the sulphuric acid produced during the sulphoxidation reaction is removed before the sulphonic acid is reacted with molecular oxygen.

Sulphonic acid salts may also be used, preferably ammonium or water-soluble alkali metal salts, for instance sodium, potassium, rubidium or caesium salts. Where salts of sulphonic acids prepared by sulphoxidation of cycloalkanes are to be used it is preferred to remove residual sulphuric acid before neutralising the sulphonic acids with a suitable base, in order to prevent a large part of the base being wasted in neutralising the sulphuric acid.

It is preferred to use mono-sulphonic acids in the process of the present invention, but di- and polysulphonic acids, in which the sulphonic acid groups are not on the same carbon, can also be used. These give rise to mixtures of dicarboxylic acids.

The molecular oxygen may be fed to the reaction alone or mixed with inert diluents. Air is a suitable source of molecular oxygen. The molecular oxygen fed to the reaction should be free from any substantial amount of $SO_2$, as this will cause further sulphoxidation to take place rather than the desired oxidation to carboxylic acids.

The reaction with molecular oxygen is preferably carried out in the liquid phase. The use of aqueous solutions of the sulphonic acid or its salt is particularly preferred. The temperature at which the reaction is carried out is suitably between about 90 and 200° C. and suitable pressures are those in the range 10 to 200 atmospheres, the pressure being preferably sufficient to maintain the cycloalkane sulphonic acid or a solution of the sulphonic acid in the liquid phase.

It may be necessary to add an initiator to the reaction mixture to start the reaction and for this purpose hydrogen peroxide, organic peroxides, or other free radical initiators may be used.

The invention is illustrated by the following examples.

EXAMPLE 1

A crude sulphoxidation product of cyclohexane was dissolved in water and the solution steam distilled to remove first volatile organic material, and then sulphuric acid. The solution so obtained contained 1.16 equivalents of total sulphonic acids per litre of solution. This was neutralised with sodium hydroxide and 50 mls. of 100 volume hydrogen peroxide per litre added. This mixture was charged to an autoclave and heated to 130° C. under an initial oxygen pressure of 50 atms. for 6 hours. The mixture absorbed oxygen throughout this period. The strongly acid reaction product was removed from the autoclave, neutralised with sodium hydroxide and extracted with ether. About 5 gm. of neutral product (mainly cyclohexanone) were recovered per litre of initial sulphonic acid solution, together with a small amount of cyclohexanol. From the neutralised acid portion about 25 gms. per litre of sulphonic acid solution of a solid acid were recovered by acidification and ether extraction. This acid was identified as adipic acid from its infra-red spectrum and by comparison of the gas chromatographic behaviour of the methyl ester compared with authentic dimethyl adipate.

In place of the sulphoxidation product of cyclohexane that derived from cyclopentane, and cyclobutane may be used.

EXAMPLE 2

A solution of cyclo-octane sulphonic acid was prepared by sulphoxidising cyclo-octane in the presence of acetic acid, steam distilling the sulphoxidation product in aqueous solution to remove unchanged hydrocarbon and any volatile products and removing sulphuric acid by precipitating as barium sulphate. The solution, still containing some acetic acid, was neutralised with sodium hydroxide. By potentiometric titration the solution contained no sulphuric acid, 0.573 equivalent of sulphonic acid and 0.12 equivalent of carboxylic acid per litre of solution.

380 mls. of this solution were charged to a batch autoclave with 10 mls. of 100 volume hydrogen peroxide, the pressure raised to 50 atmospheres with oxygen and the temperature maintained at 130° C. for 7 hours. Potentiometric analysis of the product showed it to contain 0.32 equivalent of sulphuric acid, 0.38 of sulphonic acid and 0.50 of carboxylic acids per litre of solution. After acidification with sulphuric acid, ether extraction gave a mixture of organic acids. These were converted to methylesters and analysed gas chromatographically, giving the composition shown below.

| | Weight percent |
|---|---|
| Oxalic acid | 8.6 |
| Malonic acid | 3.4 |
| Succinic acid | 36.0 |
| Glutaric acid | 24.3 |
| Adipic acid | 10.2 |
| Pimelic acid | 13.3 |
| Suberic acid | 3.4 |

The acetic acid was not measured in these analyses. Instead of cyclo-octane sulphonic acid cyclodecane sulphonic acid may be used.

We claim:

1. A process for the production of dicarboxylic acids which comprises bringing a cycloalkane sulfonic acid, containing from 4 to 12 carbon atoms in the ring, or a salt thereof into contact with molecular oxygen at a temperature between 90° C. and 2000° C. and at a pressure of 10 to 200 atmospheres.

2. A process according to claim 1 wherein the sulphonic acid is cyclohexane sulphonic acid.

3. A process according to claim 1 wherein the sulphonic acid is cyclo-octane sulphonic acid.

4. A process according to claim 1 wherein the sulphonic acid is cyclopentane sulphonic acid.

5. A process according to claim 1 wherein the sulphonic acid is cyclobutane sulphonic acid.

6. A process according to claim 1 wherein the cycloalkane sulphonic acid is cyclododecane sulphonic acid.

7. A process according to claim 1 wherein the sulphonic acid or its salt is present in an aqueous solution.

8. A process according to claim 1 wherein the cycloalkane sulphonic acid or a salt thereof is brought into contact with molecular oxygen in the presence of a free radical initiator.

9. A process for the production of dicarboxylic acids wherein a cycloalkane containing between 4 and 12 carbon atoms in the ring is sulphoxidized by reaction with sulfur dioxide and oxygen, whereby at least one member selected from the group consisting of said cycloalkane monosulfonic acid, disulfonic acids and polysulfonic acids, is obtained and said sulphoxidation product is reacted with molecular oxygen according to claim 1.

10. The process according to claim 1 wherein air is the source of oxygen.

11. The process according to claim 1 wherein the sulfonic acid is methyl cyclopentane sulfonic acid.

References Cited

UNITED STATES PATENTS 2,226,357   12/1940   Olin et al. _____ 260—533

LORRAINE A. WEINBERGER, *Primary Examiner.*

V. GARNER, *Assistant Examiner.*

U.S. Cl. X.R.

260—503, 533